United States Patent
Fujita et al.

(10) Patent No.: US 8,625,969 B2
(45) Date of Patent: Jan. 7, 2014

(54) IMAGE PROCESSING APPARATUS AND IMAGE PROCESSING METHOD

(75) Inventors: Shinichi Fujita, Kanagawa (JP); Sensaburo Nakamura, Shizuoka (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 13/075,555

(22) Filed: Mar. 30, 2011

(65) Prior Publication Data

US 2011/0249958 A1 Oct. 13, 2011

(30) Foreign Application Priority Data

Apr. 7, 2010 (JP) ............................... P2010-088463
Apr. 7, 2010 (JP) ............................... P2010-088464

(51) Int. Cl.
*G11B 27/00* (2006.01)
*H04N 5/93* (2006.01)
*G11B 27/034* (2006.01)
*G11B 27/038* (2006.01)

(52) U.S. Cl.
CPC ............ *G11B 27/034* (2013.01); *G11B 27/038* (2013.01)
USPC ....................................................... 386/278

(58) Field of Classification Search
USPC ................................. 386/278–290
See application file for complete search history.

(56) References Cited

U.S. PATENT DOCUMENTS

| 2002/0021832 | A1* | 2/2002 | Dawson ......................... 382/154 |
| 2005/0089212 | A1* | 4/2005 | Mashitani et al. ............ 382/154 |
| 2006/0126919 | A1* | 6/2006 | Kitaura et al. ................ 382/154 |
| 2010/0309287 | A1* | 12/2010 | Rodriguez ....................... 348/43 |
| 2011/0090217 | A1* | 4/2011 | Mashitani et al. ............ 345/419 |
| 2011/0109731 | A1* | 5/2011 | Koo et al. ........................ 348/51 |

FOREIGN PATENT DOCUMENTS

JP 8 321992 12/1996

* cited by examiner

*Primary Examiner* — Gelek W Topgyal
(74) *Attorney, Agent, or Firm* — Wolf, Greenfield & Sacks, P.C.

(57) ABSTRACT

Disclosed herein is an image processing apparatus for editing a three-dimensional video, including, a switching section configured to switch a video to be used as an editing result from a first three-dimensional video to a second three-dimensional video by any one of a plurality of switching methods, a parallax measuring section configured to measure a parallax in a three-dimensional video to compute a depth of the three-dimensional video on the basis of a measured parallax, a comparing section configured to compare a difference between a first depth computed on the first three-dimensional video and a second depth computed on the second three-dimensional video that is different from the first three-dimensional video with a predetermined threshold, and a restricting section configured to restrict an operation of the switching section in accordance with a comparison result obtained by the comparing section.

15 Claims, 13 Drawing Sheets

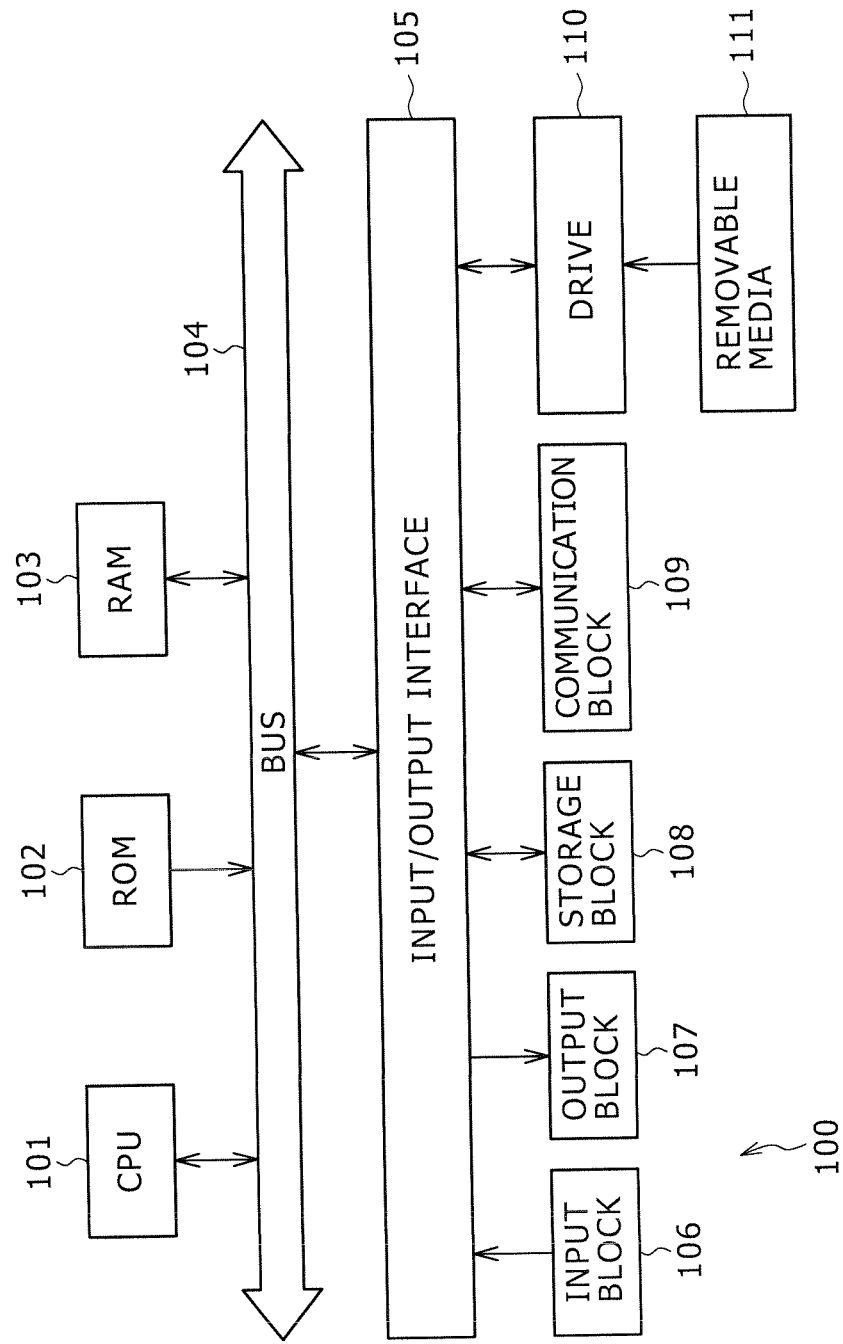

IMAGE PROCESSING APPARATUS AND IMAGE PROCESSING METHOD

BACKGROUND OF THE INVENTION

1. Field of the Invention

The present invention relates to an image processing apparatus and an image processing method, more particularly, to an image processing apparatus, an image processing method, and a program that are configured to be suitably used in switching three-dimensional moving images allowing stereoscopic viewing.

2. Description of the Related Art

With the emergence of television receivers capable of displaying three-dimensional moving images (hereafter referred to as 3D video) that allows stereoscopic viewing, it is expected for 3D video images to be used for not only the content in particular genres such as movies but also the content in various other genres as television programs, for example.

In the process of producing a television program for example, an editing task for switching from video A to video B is executed frequently. This holds true with the process of creating content based on 3D video and a switcher (an edit instruction apparatus) suitable for the switching between three-dimensional images for example is proposed (refer to Japanese Patent Laid-open No. Hei 8-321992 below for example).

Now, referring to FIGS. 1A to 1C, there is shown three methods of switching from video A to video B. To be more specific, FIG. 1A shows a method of instantaneously switching (instantaneous switching) from video A to video B. FIG. 1B shows a method (wiping) of switching sequentially from one end of video A to video B. FIG. 1C shows a method (mixing, fade-in or fade-out) of switching from video A to video B by gradually lowering the luminance of video and gradually raising the luminance of video B.

SUMMARY OF THE INVENTION

In switching 3D video images, any of the methods shown in FIGS. 1A through 1C may be used. However, this may causes problems that are never observed with two-dimensional video images.

To be more specific, in the case where 3D video A is switched to 3D video B by the wipe processing shown in FIG. 1B, a video halfway in switching may occur if the area of 3D video A and the area of 3D video B exist together as with the center video shown in FIG. 1B.

FIG. 2 shows a state in which a video halfway in switching is seen from the extension of the vertical axis of that screen. It should be noted that, in FIG. 2, the distance between the cross-hatched pentagons on the screen is indicative of the parallax of 3D video A and the distance between the triangles on the screen is indicative of the parallax of 3D video B. For example, as shown in FIG. 2, setting the depth obtained by the parallax of 3D video A occupying the right side of FIG. 2 toward the viewer from the screen and the depth obtained by the parallax of 3D video B occupying the left side of the FIG. 2 from the viewer into the screen may increase the difference between the depths of a subject existing on the screen. If this happens, the increased difference not only gives the viewer looking at the video the sense of abnormalcy but also fatigues the eyes of the viewer, eventually making the 3D video hard to view.

It should be noted that the instantaneous switching shown in FIG. 1A and the mixing switching shown in FIG. 1C are known to provide a video that is not hard to view as compared with the wiping switching shown in FIG. 1B.

Therefore, the present invention addresses the above-identified and other problems associated with related-art methods and apparatuses and solves the addressed problems by providing an image processing apparatus and an image processing method that are configured to switch 3D video images without giving the viewer the sense of abnormalcy with the video and burdening the eyes of the viewer.

In carrying out the invention and according to one embodiment thereof, there is provided an image processing apparatus for editing a 3D (Three Dimensional) video. This image processing apparatus has switching means for switching a video to be used as an editing result from a first 3D video to a second 3D video by any one of a plurality of switching methods; parallax measuring means for measuring a parallax in a 3D video to compute a depth of the 3D video on the basis of a measured parallax; comparing means for comparing a difference between a first depth computed on the first 3D video and a second depth computed on the second 3D video that is different from the first 3D video with a predetermined threshold; and restricting means for restricting an operation of the switching means in accordance with a comparison result obtained by the comparing means.

The two or more of switching methods includes at least wiping and, if the difference between the first depth and the second depth is found to be equal to or higher than the predetermined threshold, then the restricting means controls the switching means to restrict the switching from the first 3D video to the second 3D video by the wiping.

The above-mentioned image processing apparatus can further have holding means for holding the first 3D video and the second 3D video as still images, wherein the switching means uses the still image held in the holding means for a video to be used as an edited result during a period in which the first 3D video is switched to the second 3D image.

The above-mentioned two or more switching methods include at least wiping, instantaneous switching, and mixing.

If the difference between the first depth and the second depth is found to be equal to or higher than the predetermined threshold, then the restricting means controls the switching means to execute switching from the first 3D video to the second 3D video by a switching method other than the wiping.

In carrying out the invention and according to another embodiment thereof, there is provided an image processing method for an image processing apparatus for editing a 3D video. This method has the steps of: switching a video to be used as an editing result from a first 3D video to a second 3D video by any one of a plurality of switching methods; measuring a parallax in a 3D video to compute a depth of the 3D video on the basis of a measured parallax; comparing a difference between a first depth computed on the first 3D video and a second depth computed on the second 3D video that is different from the first 3D video with a predetermined threshold; and restricting an operation of the switching step in accordance with a comparison result obtained in the comparing step.

In one embodiment of the present invention, the parallaxes of 3D videos are measured. On the basis of the measured parallaxes, depths of the 3D videos are computed. Then, a difference between the computed depths of the first 3D video and the second 3D video is compared with a predetermined threshold. In accordance with an obtained comparison result, an operation of switching the video to be employed for an editing result from the first 3D video the second 3D video is restricted.

In carrying out the invention and according to another embodiment thereof, there is provided an image processing apparatus for editing a 3D (Three Dimensional) video. This image processing apparatus has switching means for switching a video to be used as an editing result from a first 3D video to a second 3D video by any one of a plurality of switching methods; parallax measuring means for measuring a parallax between the first 3D video and the second 3D video to compute a depth on the basis of a measured parallax; acquiring means for acquiring a fader value indicative of a degree of progress of a sequence of processing operations for switching the first 3D video to the second 3D video; and parallax adjusting means for adjusting parallaxes of the first 3D video and the second 3D video in accordance with the acquired fader value; wherein, if wiping is selected for the switching method, the switching means switches the first 3D video to the second 3D video by wiping in a state where the parallaxes are adjusted so as to match the depth of the first 3D video with the depth of the second 3D video.

The above-mentioned image processing apparatus can further have holding means for holding a parallax adjustment section parameter indicative of separations between a first adjustment section, a switching section, and a second adjustment section that make up the sequence of processing operations, wherein the switching means switches the first 3D video to the second 3D video by wiping in a state where the parallaxes are adjusted so as to match the depth of the first 3D video with the depth of the second 3D video.

The above-mentioned image processing apparatus can further have the parallax adjusting means, wherein the parallax adjusting means, in response to a progress of the acquired fader value, adjusts the parallax of at least one of the first 3D video and the second 3D video such that the depth of the first 3D video and the depth of the second 3D video match each other in the first adjustment section and adjusts the parallax of the second 3D video to be returned to an original value thereof in the second adjustment section.

The above-mentioned image processing apparatus having the parallax adjusting means, wherein the parallax adjusting means, in response to a progress of the acquired fader value, adjusts the parallax of at least one of the first 3D video and the second 3D video such that at least one of distances of the depths of the first 3D video and the second 3D video is compressed to match the distances of the depths in the first adjustment section and adjusts the parallax of the the second 3D video to be returned to an original value thereof in the second adjustment section.

The above-mentioned image processing apparatus having the switching means, wherein, if mixing is selected for the switching method, the switching means switches the first 3D video to the second 3D video in a state where the parallaxes are adjusted so as to bring the depth of the first 3D video to the depth of the second 3D video.

The image processing apparatus according to claim 8, further including:

operation input means for a user to control the fader value.

In carrying out the invention and according to still another embodiment thereof, there is provided an image processing method for an image processing apparatus for editing a 3D video, including the steps of: measuring a parallax between the first 3D video and the second 3D video to compute a depth of the 3D video on the basis of a measured parallax; acquiring a fader value indicative of a degree of progress of a sequence of processing operations for switching the first 3D video to the second 3D video; and adjusting parallaxes of the first 3D video and the second 3D video in accordance with the acquired fader value; and if wiping is selected for a switching method, switching the first 3D video to the second 3D video by wiping in a state where the parallaxes are adjusted such that the depths of the first 3D video and the second 3D video match each other.

As described and according to one embodiment of the present invention, 3D video switching can be achieved without giving viewers the sense of abnormalcy and the burden on their eyes.

BRIEF DESCRIPTION OF THE DRAWINGS

FIG. 19 is a block diagram illustrating an exemplary configuration of a computer.

DETAILED DESCRIPTION OF THE PREFERRED EMBODIMENTS

This invention will be described in further detail by way of best modes (hereafter referred to as embodiments) thereof with reference to the accompanying drawings.

1. Embodiments

[Exemplary Configuration of a 3D Video Editing Apparatus]

Figure 1A:
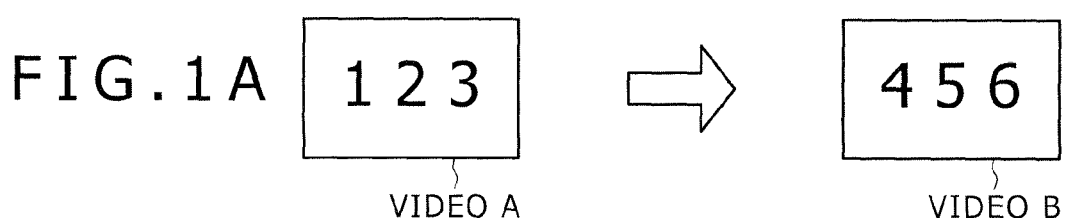
FIGS. 1A to 1C are diagrams illustrating three kinds of methods of video switching.
Figure 1B:
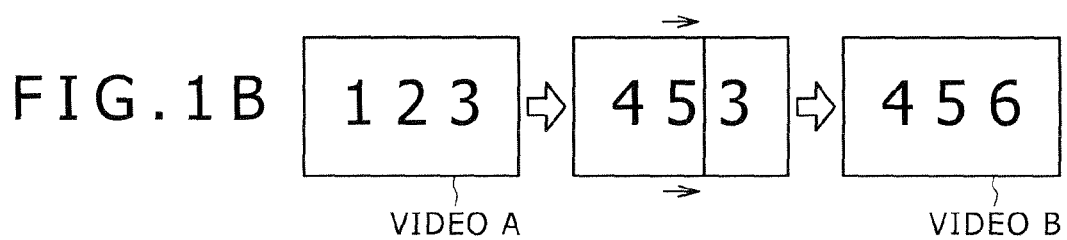
Figure 1C:
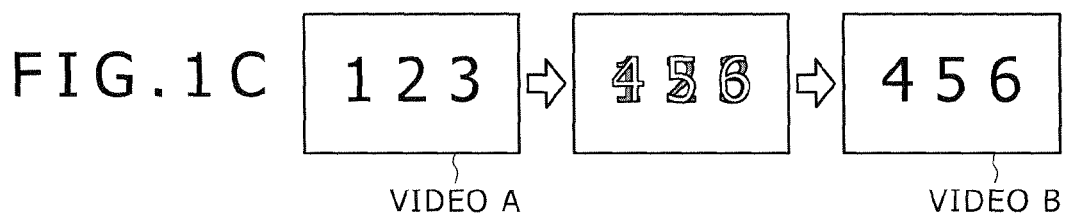
Figure 2:
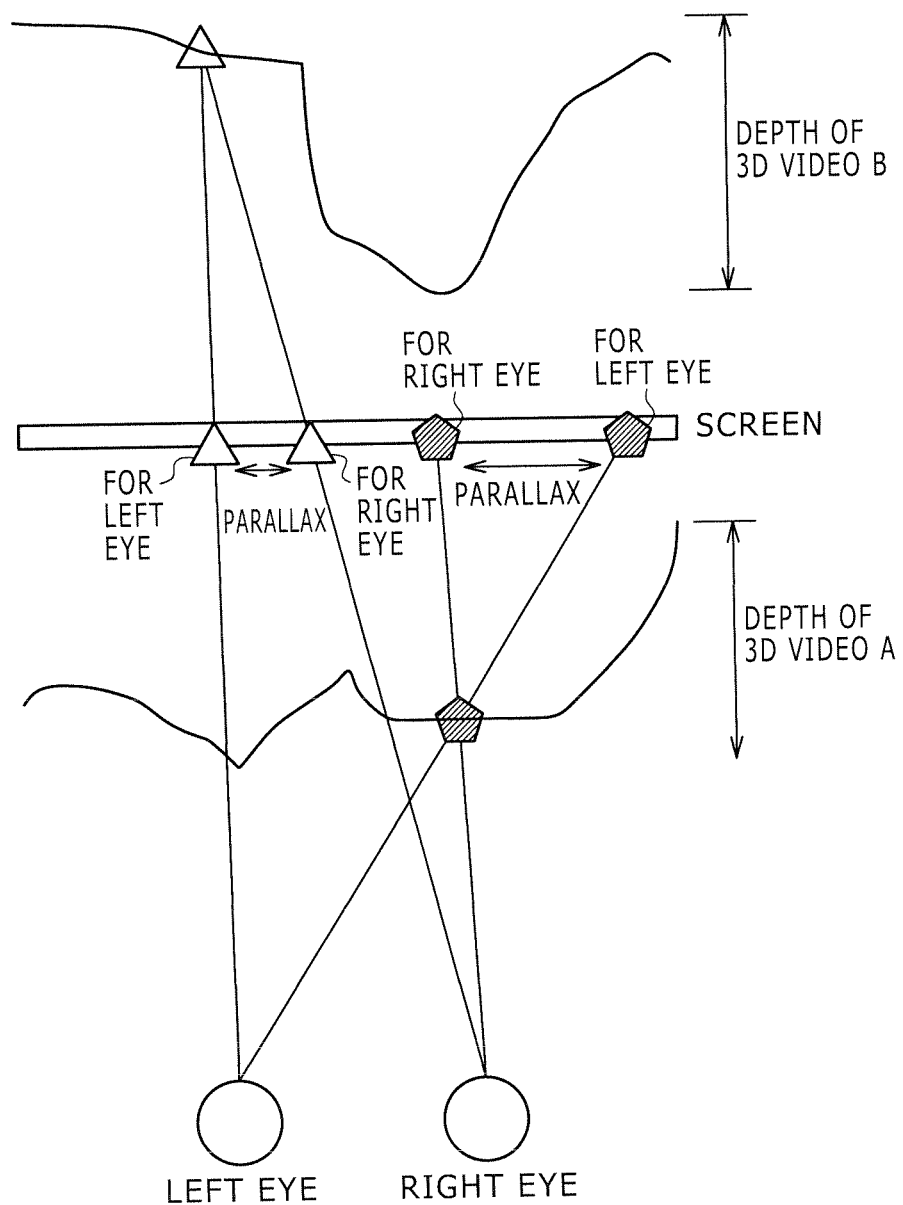
FIG. 2 is schematic diagram illustrating a process of 3D video switching based on wiping.
Figure 3:
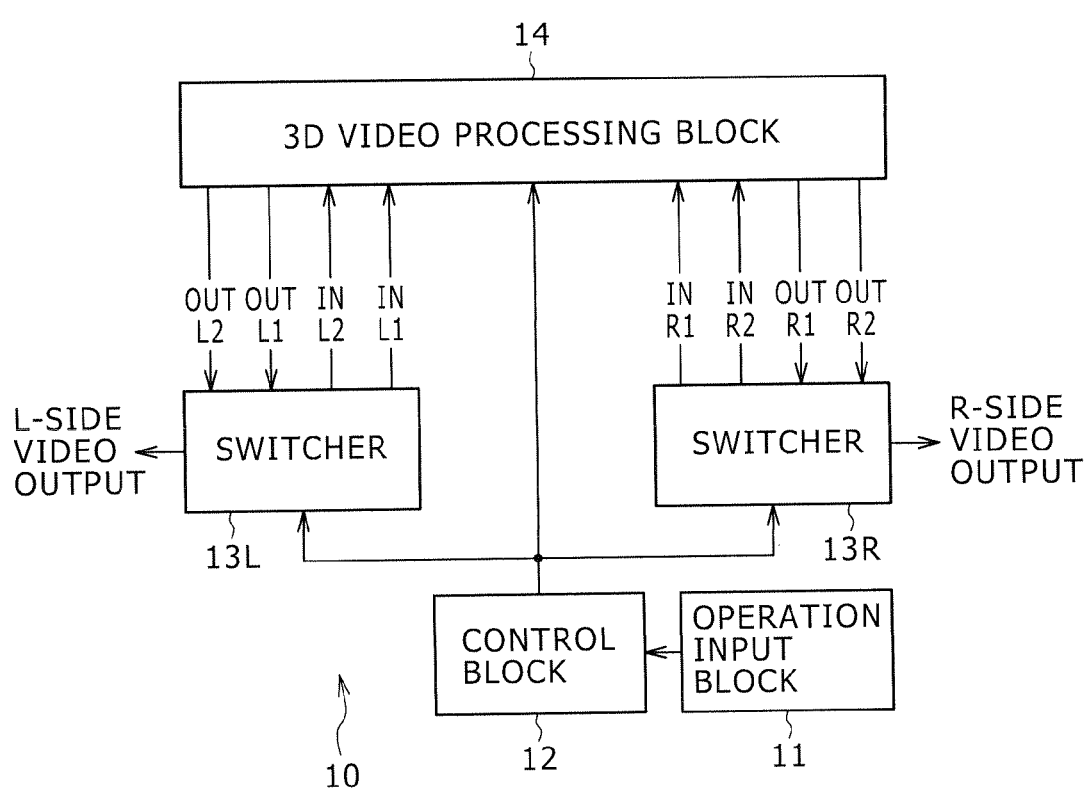
FIG. 3 is a block diagram illustrating an exemplary configuration of a 3D video editing apparatus practiced as one embodiment of the invention.

Referring to FIG. 3, there is shown an exemplary configuration of a 3D video editing apparatus practiced as one embodiment of the invention. This 3D video editing apparatus 10 is configured by an operation input block 11, a control block 12, switchers 13L and 13R, and a 3D video processing block 14.

The operation input block 11 generates an operation signal corresponding to a user operation done and outputs the generated operation signal to the control block 12. The control block 12 outputs a control signal on the basis of the supplied operation signal to control each of the component blocks of the 3D video editing apparatus 10.

Under the control of the control signal supplied from the control block 12 on the basis of user's selecting operation, the switchers 13L and 13R select a maximum of two video sources from among entered M (9 for example) types of video sources (may include not only 3D video sources but also 2D video sources) and outputs the selected video sources to the 3D video processing block 14. Further, the switchers 13L and 13R selects one of M entered video sources, selects two or more types to synthesize the selected video sources, and switches between the selections, thereby outputting a resultant video as edited content to the subsequent stage. It should be noted that the video for the left eye of a video source is entered in the switcher 13L and the video for the right eye corresponding to the left-eye video entered in the switcher 13L is entered in the switcher 13R.

The 3D video processing block 14 measures the parallaxes of the left-eye video entered from the switcher 13L and the corresponding right-eye video entered from the switcher 13R and, on the basis of a resultant measurement, adjusts the parallaxes of the left-eye video and the right-eye video. Further, the 3D video processing block 14 holds the videos for the left eye and the right eye and outputs these videos as still images. Then, the 3D video processing block 14 outputs the processed video as the video source to be entered in the switcher 13L or the switcher 13R.

Figure 4:
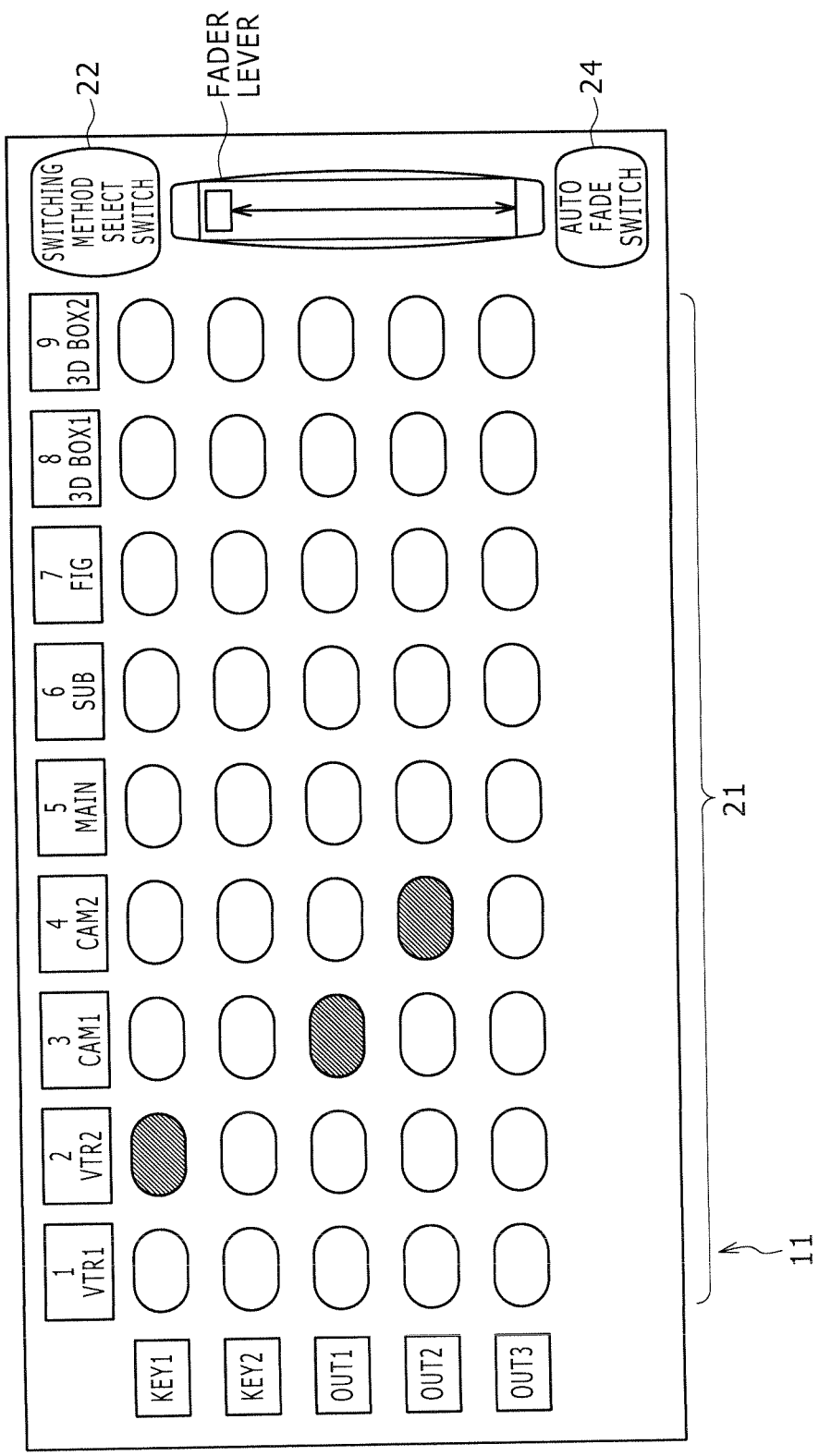
FIG. 4 is an external view illustrating an exemplary configuration of an operation input block shown in FIG. 3.

FIG. 4 shows an exemplary external configuration of the operation input block 11. The operation input block 11 is arranged with a matrix switch 21, a switching method select switch 22, a fader lever 23, and an auto fade switch 24.

The matrix switch 21 is made up of horizontal M×vertical N switches arranged in a matrix. In the example shown in FIG. 4, M=9 and N=5 amounting to a total of 45 switches.

The horizontal direction of the matrix switch 21 is related with M types of video sources that are entered in the switcher 13L and the switcher 13R. In this figure, from the left, VTR1 video source, VTR2 video source, CAM1 video source, CAM2 video source, Main video source, Sub video source, Fig video source, 3DBOX1 video source, and 3DBOX2 video source, in this sequence.

The vertical direction of the matrix switch 21 is related with N types of image selections. In FIG. 4, selection as Key1, selection as Key2, selection as Out1, selection as Out2, and selection as Out3 are related in this sequence. In what follows, the description will be made with the video (the first video) before switching in content being Out1 and the video (the second video) after switching being Out2.

It should be noted that M switches on each row (in the horizontal direction) can be turned on only one at a time. For example, when the switch second to the left end on the top row is turned on, the video source of VTR2 is selected as the first key video (Key1). For example, when the switch third from the left end on the third row from top is turned on, the video source of CAM1 is selected as the first output video (Out1). Further, for example, when the switch fourth from the left end on the fourth row from top is selected, the video source of CAM2 is selected as the second output video (Out2).

The switching method select switch 22 is used to select a switching method for switching the first output video in display to the second output video, for example. Every time the switching method select switch 22 is turned on, the switching methods are changed from instantaneous switching to wiping to mixing to instantaneous switching, and so on, for example. It should be noted that the switching method select switch 22 may be configured by three switches to which instantaneous switching, wiping, and mixing are assigned. Alternatively, two or more variations (digital special effect wiping for example) to wiping may be arranged.

The fader lever 23 controls the switching timing of switching the first output video in display to the second output video and is slid up and down for control. A state in which the fader lever 23 is set to the topmost position is representative of switching start time (the fader value=0%). A state in which the fader lever 23 is set to the bottom position is representative of switching end time (the fader value=100%). Sliding the fader lever 23 at a desired speed, the user can control the switching speed as desired. It should be noted that various controls may be arranged to allow the user to controls the details of switching operations.

The auto fade switch 24 is used to automatically slide the fader lever 23 at a predetermined speed. Turning on the auto fade switch 24 allows the first output video in display to be automatically switched to the second video output at a predetermined speed without user's operating the fader lever 23.

Figure 5:
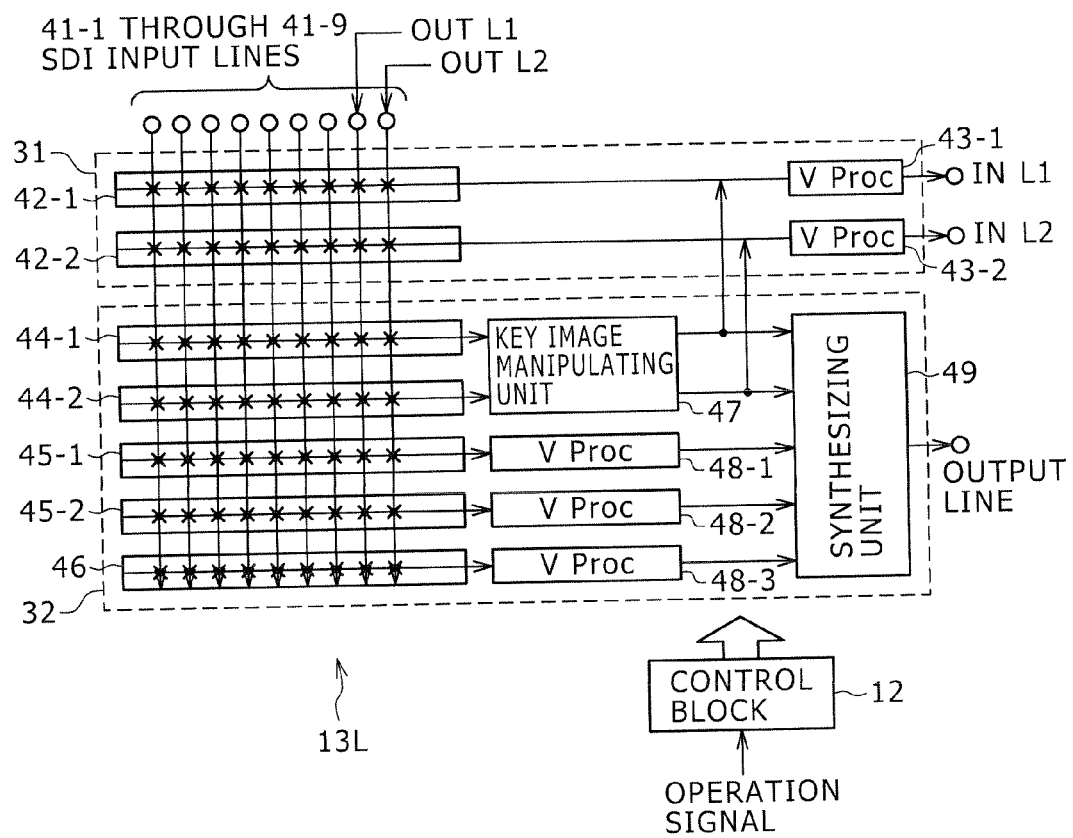
FIG. 5 is a block diagram illustrating an exemplary configuration of a switcher shown in FIG. 3.

FIG. 5 shows an exemplary configuration of the switcher 13L. The switcher 13L is made up of an auxiliary output block 31 and an input selection block 32. It should be noted that the switcher 13R is configured in substantially the same manner as the switcher 13L, so that the description of the switcher 13R is omitted.

The auxiliary output block 31 is configured by M (hereafter described as M=9) types of SDI input lines 41-1 through 41-9, auxiliary output select bus 42-1 and 42-2, and video manipulation units (V Proc) 43-1 and 43-2.

The SDI input lines 41-1 through 41-9 are entered with video sources VTR1, VTR2, CAM1, CAM2, Main, Sub, Fig, 3DBOX1, and 3DBOX2 shown in FIG. 4, respectively. It should be noted that the SDI input lines 41-8 and 41-9 are entered with the results obtained by processing two types of video sources by the 3D video processing block 14 among the video sources entered in the SDI input lines 41-1 through 41-7.

The auxiliary output select bus 42-1 outputs one of the seven types (for the left eye) of video sources entered in the SDI input lines 41-1 through 41-7 to the video manipulation unit 43-1 under the control of the control block 12. The auxiliary output select bus 42-2 outputs one of the seven types (for the left eye) of video sources entered in the SDI input lines 41-1 through 41-7 to the video manipulation unit 43-2 under the control of the control block 12. The video manipulation unit 43-1 executes predetermined video manipulation processing on the video source from the auxiliary output select bus 42-1 and outputs the processed video source to the 3D video processing block 14. The video manipulation unit 43-2 executes predetermined video manipulation processing on the video source from the auxiliary output select bus 42-2 and outputs the processed video source to the 3D video processing block 14.

The input selection block 32 is made up of manipulation buses 44-1 and 44-2, input buses 45-1 and 45-2, a reserved input bus 46, a key image manipulation unit 47, video manipulation units 48-1 through 48-3, and a synthesizing unit 49.

The manipulation buses 44-1 and 44-2 output one of the nine types of video sources entered in the SDI input lines 41-1 through 41-9 to the key image manipulation unit 47 under the control of the control block 12. The input bus 45-1 outputs one of the nine types of video sources entered in the SDI input lines 41-1 through 41-9 to the video manipulation unit 48-1 as the first video before switching content to be outputted as a result of the editing by the 3D video editing apparatus 10. The input bus 45-2 outputs one of the nine types of video sources entered in the SDI input lines 41-1 through 41-9 to the video manipulation unit 48-2 as the second video before switching content to be outputted as a result of the editing by the 3D video editing apparatus 10. The reserved input bus 46 outputs one of the nine types of video sources entered in the SDI input lines 41-1 through 41-9 to the video manipulation unit 48-3 as the third video that is reserved.

The key image manipulation unit 47 executes predetermined manipulation processing with the video source entered from the manipulation buses 44-1 and 44-2 as a key image and outputs a resultant video to the auxiliary output select buses 42-1 and 42-2 and the synthesizing unit 49.

The video manipulation units 48-1 through 48-3 executes predetermined manipulation processing on the entered video source and outputs a resultant video to the synthesizing unit 49.

Under the control of the synthesizing unit 49, the synthesizing unit 49 selects videos entered from the key image manipulation unit 47 and manipulation buses 44-1 through 44-3 and synthesizes the selected videos, thereby generating the video of content that is outputted from the output line as an editing result. In addition, the synthesizing unit 49 executes switching processing for switching from the first video entered from the manipulation bus 44-1 to the second video entered from the manipulation bus 44-2 as the video of content to be outputted from the output line as an editing result. Details of this processing will be described later with reference to FIG. 7.

Figure 6:
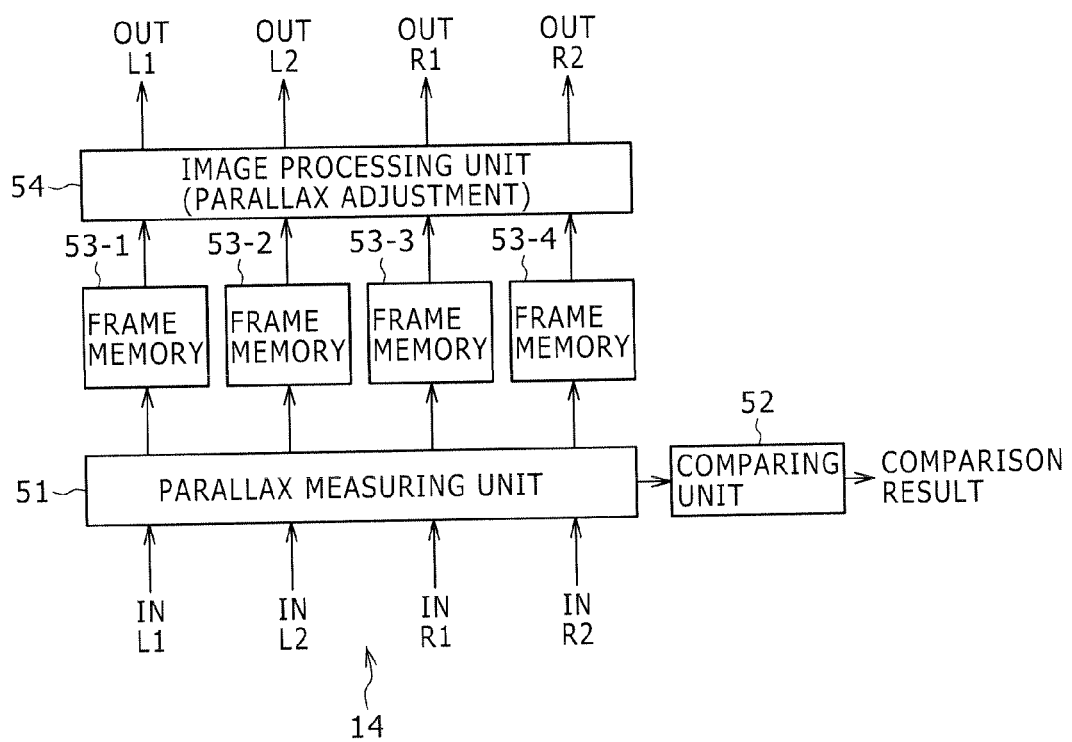
FIG. 6 is a block diagram illustrating an exemplary configuration of a 3D video processing block shown in FIG. 3.

FIG. 6 shows an exemplary configuration of the 3D video processing block 14. The 3D video processing block 14 is configured by a parallax measuring unit 51, a comparison unit 52, frame memories 53-1 through 53-4, and an image processing unit 54.

The parallax measuring unit 51 measures parallaxes of the left-eye video source entered from the switcher 13L via the input line INL1 and the right-eye video source entered from the switcher 13R via the input line INR1. In addition, the parallax measuring unit 51 computes a depth (a first depth) obtained from the measured parallax and outputs the obtained depth to the comparison unit 52. It should be noted that, in order to make distinction between the case where the depth is in front of the screen (toward the viewer) and the case where the depth is in the back of the screen, the depth in front of the screen is indicated by a negative value and the depth in the back of the screen is indicated by a positive value, for example. Because the parallax and the depths are not obviously uniform all over the screen, maximum values, minimum values, or mode values are used for parallax and depth values.

The parallax measuring unit 51 also measures parallaxes of a left-eye video source entered from the switcher 13L via input line INL2 and a right-eye video source entered from the switcher 13R via input line INR2 corresponding to the left-eye video source. In addition, the parallax measuring unit 51 computes a depth (a second depth) obtained by the measured parallax and outputs the obtained depth to the comparison unit 52. It should be noted that the measurement of the parallaxes and the computation of the depths may be executed by applying existing techniques.

Further, the parallax measuring unit 51 outputs the video source with the parallax measured to the frame memories 53-1 through 53-4.

The comparison unit 52 compares a difference between the first depth and the second depth entered from the parallax measuring unit 51 with a predetermined threshold and notifies the control block 12 of a comparison result.

The frame memory 53-1 outputs the frame of the left-eye video source with the parallax measured entered from the switcher 13L via the input line INL1 to the image processing unit 54 while sequentially holding the frame. The frame memory 53-2 outputs the frame of the left-eye video source with the parallax measured entered from the switcher 13L via the input line INL2 to the image processing unit 54 while sequentially holding the frame. The frame memory 53-3 outputs the frame of the right-eye video source with the parallax measured entered from the switcher 13R via the input line INR1 to the image processing unit 54 while sequentially holding the frame. The frame memory 53-4 outputs the frame of the right-eye video source with the parallax measured entered from the switcher 13R via the input line INR2 to the image processing unit 54 while sequentially holding the frame.

The image processing unit 54 adjusts the parallaxes of the left-eye video source from the frame memory 53-1 and the corresponding right-eye video source from the frame memory 53-3 and outputs the resultant left-eye video source and right-eye video source to the switcher 13L and the switcher 13R via the OUTL1 and the OUTR1, respectively. In addition, the image processing unit 54 adjusts the parallaxes of the left-eye video source from the frame memory 53-2 and the corresponding right-eye video source from the frame memory 53-4 and outputs the resultant left-eye video source and right-eye video source to the switcher 13L and the switcher 13R via the OUTL2 and the OUTR2, respectively. It should be noted that the video sources from the frame memories 53-1 through 53-4 may be directly outputted to the switcher 13L and the switcher 13R without adjusting the parallax by the image processing unit 54.

[Description of Operation 1]

The following describes an operation of the 3D video editing apparatus 10, in which, of the video sources to be entered in the 3D video editing apparatus 10, the video source of CAM1 is used for the content to be outputted and then the CAM1 video source is switched to the CAM2 video source, for example.

First, in order to set the CAM1 video source to the video before switching (the first video), the user turns on the third switch from the left end on the third row from top of the matrix switch 21 of the operation input block 11. Also, in order to specify the CAM2 video source as the video after switching (the second video) in advance, the user turns on the fourth switch from the left end on the fourth row from top of the matrix switch 21. Also, the user selects one of the switching methods by operating the switching method select switch 22 of the operation input block 11.

Under the control of the control block 12 in response to the user operation done on the matrix switch 21, the left-eye video source of CAM1 entered in the SDI input line 41-3 is selected on the input bus 45-1 of the switcher 13L to be entered in the synthesizing unit 49 via the video manipulation unit 48-1. Also, the left-eye video source of CAM2 entered in the SDI input line 41-4 is selected on the input bus 45-2 and the selected video source is entered in the synthesizing unit 49 via the video manipulation unit 48-2. Then, because it is currently before video switching, the left-eye video source of CAM1 is outputted from the synthesizing unit 49. Likewise, with the switcher 13R, the right-eye video source of CAM1 is outputted from the output line.

Further, under the control of the control block 12 in response to the user operation done on the matrix switch 21, the left-eye video source of CAM1 entered in the SDI input line 41-3 is selected on the auxiliary output select bus 42-1 and the selected video source is entered in the parallax measuring unit 51 of the 3D video processing block 14 via the input line INL1. The left-eye video source of CAM2 entered in the SDI input line 41-4 is selected by the auxiliary output select bus 42-1 and the selected video source is entered in the parallax measuring unit 51 of the 3D video processing block 14 via the input line INL2.

On the other hand, as with the switcher 13R, the right-eye video source of CAM1 is selected and the selected video source is entered in the parallax measuring unit 51 of the 3D video processing block 14 via the input line INR1 and the right-eye video source of CAM2 is selected and the selected video source is entered in the parallax measuring unit 51 of the 3D video processing block 14 via the input line INR2.

The parallax measuring unit 51 computes the first depth based on the parallax of the CAM1 video source and the second depth based on the parallax of the CAM2 video source and outputs the computed depths to the comparison unit 52. The comparison unit 52 compares a difference between the first depth and the second depth with a predetermined threshold and notifies the control block 12 of a comparison result.

On the basis of the notified comparison result and the selection by the switching method select switch 22, the control block 12 determines whether to enable the execution of the selected switched method or not.

Next, only when the execution of the selected switching method is enabled, the CAM1 video is switched to the CAM2 video by the selected switching method by the synthesizing unit 49 upon the sliding of the fader lever 23 by the user or the pressing of the auto fade switch 24 by the user. However, in the switching period (the period from fader values 0% to 100%), the left-eye video source of CAM1 coming via the 3D video processing block 14 entered in the SDI input line 41-8 is selected on input bus 45-1 of the switcher 13L and the left-eye video source coming via the 3D video processing block 14 entered in the SDI input line 41-9 is selected on the input bus 45-2. This holds true with the switcher 13R. Consequently, during the switching period, the video coming via the 3D video processing block 14 is used.

It should be noted that, according to the operation described above, the video is a moving image also in the switching period; it is also practicable that the video in the switching period is a still image. In this case, the 3D video processing block 14 may be configured to output still images held in the incorporated frame memory 53. In the case of moving images, the depth changes from time to time, so that there is a possibility that the situation could largely change during the period. However, the use of still images during switching period prevents the video during switching from giving the viewer the sense of abnormalcy or burdening the eyes of the viewer.

Further, it is also practicable to output still images during a switching period and, in resuming the use of moving images entered later, perform mixing effects (fade-in and fade-out) over the still image stored in the frame memory 53 and then the moving image in a predetermined duration (for 30 frames for example), thereby executing the switching that further reduces the sense of abnormalcy felt by the viewer.

Figure 7:
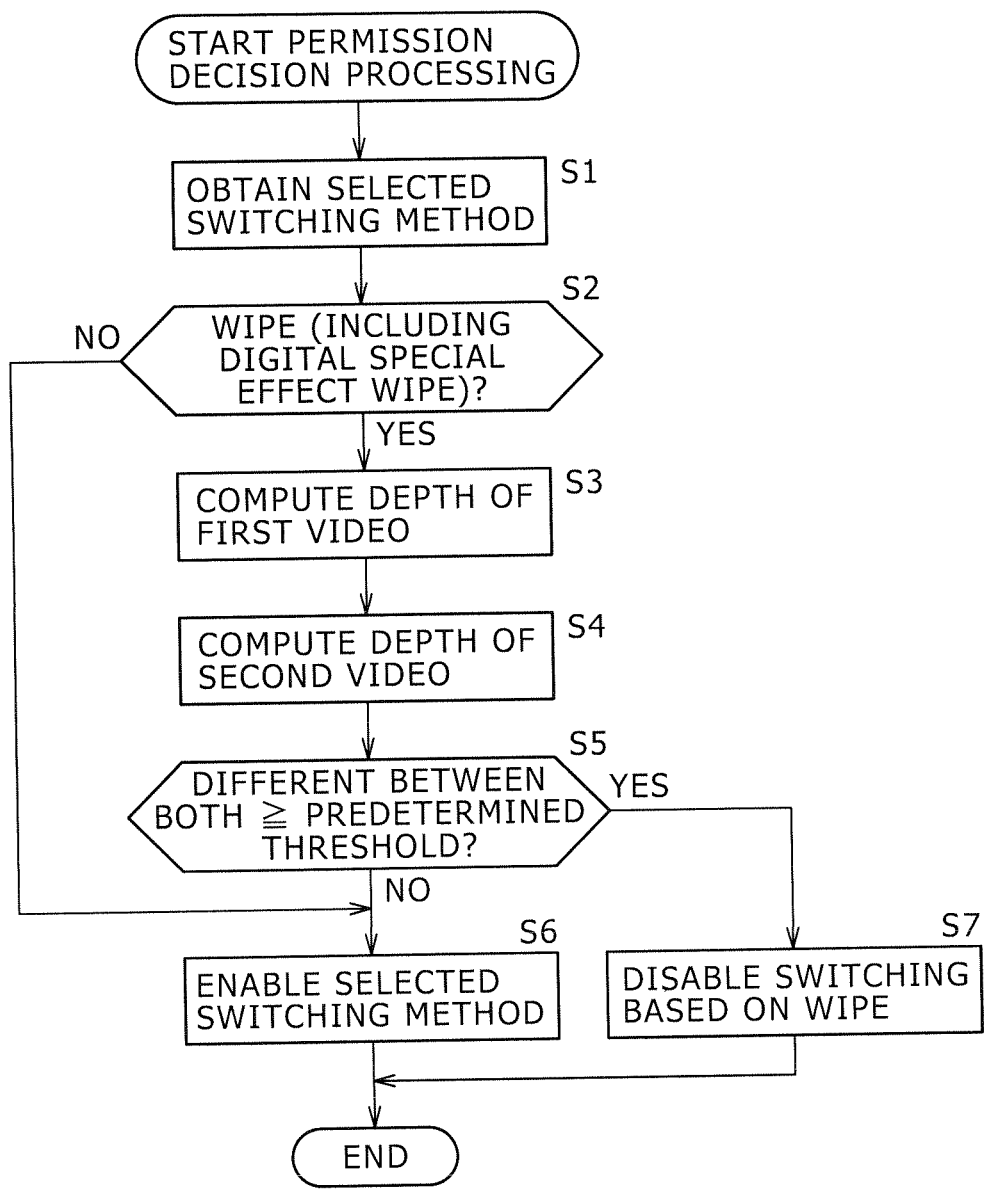
FIG. 7 is a flowchart indicative of permission decision processing.

FIG. 7 shows a flowchart indicative, in the above-mentioned operation, of the processing of determining whether to enable the execution of a selected switching method or not (hereafter referred to as permission decision processing).

In step S1, the control block 12 obtains one of switching methods, instantaneous switching, wiping, and mixing, selected by the user through the switching method select switch 22 of the operation input block 11. In step S2, the control block 12 determines whether the selected switching method is wiping. If the selected switching method is found to be wiping, then the procedure goes to step S3.

In step S3, the parallax measuring unit 51 of the 3D video processing block 14 measures a parallax of the first video (in this example, the video source of CAM1) to compute a first depth based on the obtained parallax, outputting the computed depth to the comparison unit 52. In step S4, the parallax measuring unit 51 measures a parallax of a second video (in this example, the video source of CAM2) to compute a second depth based the obtained parallax, outputting the computed depth to the comparison unit 52.

In step S5, the comparison unit 52 computes a difference between the first depth and the second depth and compares the obtained difference with a predetermined threshold, notifying the control block 12 of a comparison result. On the basis of the notified comparison result, the control block 12 determines whether the difference between the first depth and the second depth is equal to or higher than the predetermined threshold or not. If this difference is found to be not equal to or higher than the predetermined threshold (or less than the predetermined threshold), then the procedure goes to step S6.

In step S6, the control block 12 notifies the synthesizing unit 49 of the permission of the switching method selected by the user (in this example, wiping). Consequently, the synthesizing unit 49 switches the video of content from the first video source supplied from the input bus 45-1 to the video source supplied from the input bus 45-2 by the selected switching method upon the sliding of the fader lever 23 by the user or the pressing of the auto fade switch 24 by the user.

It should be noted that, if the difference between the first video depth and the second video depth is found to be equal to or higher than the predetermined threshold, then the procedure goes to step S7. In step S7, the control block 12 notifies the synthesizing unit 49 of that the selected method (wiping in this example) selected by the user is not enabled. Consequently, the synthesizing unit 49 will not execute the switching if the fader lever 23 is slid or the auto fade switch 24 is pressed by the user. Namely, the switching based on wiping is disabled. However, it is also practicable to execute switching by another switching method, such as instantaneous switching, than wiping, rather than disabling the switching itself.

In this case, it is practicable to provide means allowing the user to recognize the currently set switching method by reflecting the change of switching methods onto the state of the switching method select switch 22 of the operation input block 11. To be more specific, each switching method is indicated by the blinking, for example, of the switching method select switch 22 of the operation input block 11 for the recognition of each switching method. Further, if switching is made to another switching method than wiping, it is practicable to notify the user of the change with an alarm through a separately arranged buzzer or indicator, for example.

It should be noted that, if the switching has started and the switching is still on during a switching period, the suppression of a new switching operation is preferred. If a new switching is made while the last switching is still on, the user may be notified of such a situation with an alarm through an indicator, for example.

If the selected switching method is found not to be wiping (namely, found to be instantaneous switching or mixing) in step S2, then the procedure goes to step S6.

In step S6, the control block 12 notifies the synthesizing unit 49 of that the switching method selected by the user (in this case, instantaneous switching or mixing) is enabled. Consequently, the synthesizing unit 49 switches the video of content from the first video source supplied from the input bus 45-1 to the second video source supplied from the input bus 45-2 by the selected switching method upon the sliding of the fader lever 23 or the pressing of the auto fade switch 24 by the user. Thus, the description of the permission decision processing has been completed.

As described above and according to the 3D video editing apparatus 10, 3D video switching can be realized by instantaneous switching, wiping, or mixing, so that the expression and added value of the content to be outputted can be increased. It should be noted however that, if wiping is selected by the user as a switching method but the difference between the first video depth and the second video depth is equal to or higher than a predetermined threshold, the switching based on wiping is disabled, so that the sense of abnormalcy and the burden on the eyes of the viewer who has seen the video in the switching can be mitigated.

It should be noted that, in the above-mentioned example, wiping is used for the switching method; in the case of special effects in which the areas of two videos are separated from each other on the screen, substantially the same processing as described above is applied. This holds true with the use of a digital special effects apparatus.

Because the measurement of parallax can be always executed, whether or not wiping is always enabled may be always indicated on an indicator that is arranged on the operator means.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording medium, into a general-purpose personal computer for example in which various programs may be installed for the execution of various functions.

FIG. 6 shows an exemplary configuration of another 3D video processing block 14. This 3D video processing block 14 is made up of a parallax measuring unit 51, a parallax adjusting unit (or image processing unit) 54, and memories 53.

The parallax measuring unit 51 measures a parallax a left-eye video source (a first video source) entered from a switcher 13L via input line INL1 and a right-eye video source (a first video source) entered from a switcher 13R via input line INR1 corresponding to the left-eye video source. In addition, the parallax measuring unit 51 computes a depth (a first depth) obtained by the measured parallax and outputs the obtained depth to the parallax adjusting unit 54. It should be noted that, in order to make distinction between the depth that is toward the viewer in front of the screen and the depth that is in the rear of the screen, the former is indicated by a positive value while the latter is indicated by a negative value, for example. Because the parallax and the depths are not obviously uniform all over the screen, maximum values, minimum values, or mode values are used for parallax and depth values.

The parallax measuring unit 51 also measures parallaxes of a left-eye video source (a second video source) entered from the switcher 13L via input line INL2 and a right-eye video source (a second video source) entered from the switcher 13R via input line INR2 corresponding to the left-eye video source. In addition, the parallax measuring unit 51 computes a depth (a second depth) obtained by the measured parallax and outputs the obtained depth to the parallax adjusting unit 54. It should be noted that the measurement of the parallaxes and the computation of the depths may be executed by applying existing techniques.

Further, the parallax measuring unit 51 outputs the first and second video sources with the parallaxes measured to the parallax adjusting unit 54.

On the basis of a parallax adjustment section parameter stored in the memory 53, the parallax adjusting unit 54 adjusts the parallax of at least one of the first video source and the second video source entered from the parallax measuring unit 51 and outputs the adjusted video source to the switcher 13L or the switcher 13R via output line OUTL1 or OUTR1.

The memory 53 stores the timing of adjusting the parallaxes of the first and second video sources and a parallax adjustment section parameter indicative of a fader value relation. It should be noted that the memory 53 may only store at least one of the parallax adjustment section parameters that are shown in FIG. 8 through FIG. 14.

[Description of Operation 2]

The following describes an operation of the 3D video editing apparatus 10, in which, of the video sources entered in the 3D video editing apparatus 10, a CAM1 video source is used for the video of content to be outputted and then this CAM1 video source is switched to a CAM2 source by wiping.

First, in order to set the CAM1 video source to a video (a first video) before switching, the user turns on a third switch from the left end on a third row from top of a matrix switch 21 of an operation input block 11. In addition, in order to specify the CAM2 video source as a video (a second video) after switching, the user turns on a fourth switch from the left end on a fourth row from top of the matrix switch 21. Also, the user selects wiping as a switching method through the switching method select switch 22 of the operation input block 11.

Under the control of the control block 12 in response to the user operation done on the matrix switch 21, a left-eye video source of CAM1 entered in an SDI input line 41-3 is selected on an input bus 45-1 of the switcher 13L and the selected video source is entered in the synthesizing unit 49 through a video manipulation unit 48-1. A left-eye video source of CAM2 entered in an SDI input line 41-4 is selected on an input bus 45-2 of the switcher 13L and the selected video source is entered in the synthesizing unit 49 through a video manipulation unit 48-2. Then, because it is before video switching now, the synthesizing unit 49 outputs the left-eye video source of CAM1 is outputted. With the switcher 13R, the right-eye video source of CAM1 is outputted from an output line in substantially the same manner as the left-eye video source.

Under the control of the control block 12 in response to user operation done on the matrix switch 21, a left-eye video source of CAM1 entered in an SDI input line 41-3 is selected on an auxiliary output select bus 42-1 of the switcher 13L and the selected video source is entered in the parallax measuring unit 51 of the 3D video processing block 14 via input line INL1. A left-eye video source of CAM2 entered in an SDI input line 41-4 is selected on an auxiliary output select bus 42-2 of the switcher 13L and the selected video source is entered in the parallax measuring unit 51 of the 3D video processing block 14 via input line INL2.

On the other hand, as with the switcher 13R, the right-eye video source of CAM1 is selected and the selected video source is entered in the parallax measuring unit 51 of the 3D video processing block 14 via the input line INR1 and the right-eye video source of CAM2 is selected and the selected video source is entered in the parallax measuring unit 51 of the 3D video processing block 14 via the input line INR2.

The parallax measuring unit 51 computes a first depth on the basis of the parallax of the CAM1 video source and a second depth on the basis of the parallax of the CAM2 video source, outputting the computed depths to the parallax adjusting unit 54. On the basis of the parallax adjustment section parameter stored in the memory 53, the parallax adjusting unit 54 adjusts the parallax of at least one of the CAM1 video source and the CAM2 video source corresponding to a fader value and outputs the adjusted parallax to the switcher 13L and the switcher 13R via output lines OUTL1 through OUTR2.

In the switching period (the period from fader values 0% to 100%), the left-eye video source of CAM1 with the parallax adjusted by the 3D video processing block 14 entered in the SDI input line 41-8 is selected on the input bus 45-1 of the switcher 13L and the left-eye video source of CAM2 with the parallax adjusted by the 3D video processing block 14 entered in the SDI input line 41-9 is selected on the input bus 45-2. This holds true with the switcher 13R. Consequently, during the switching period, the video with the parallax adjusted by the 3D video processing block 14 is used.

[Specific Example of Parallax Adjustment]

The following specifically describes the parallax adjustment to be executed when switching from the first video to the second video on the basis of wiping.

Figure 8:
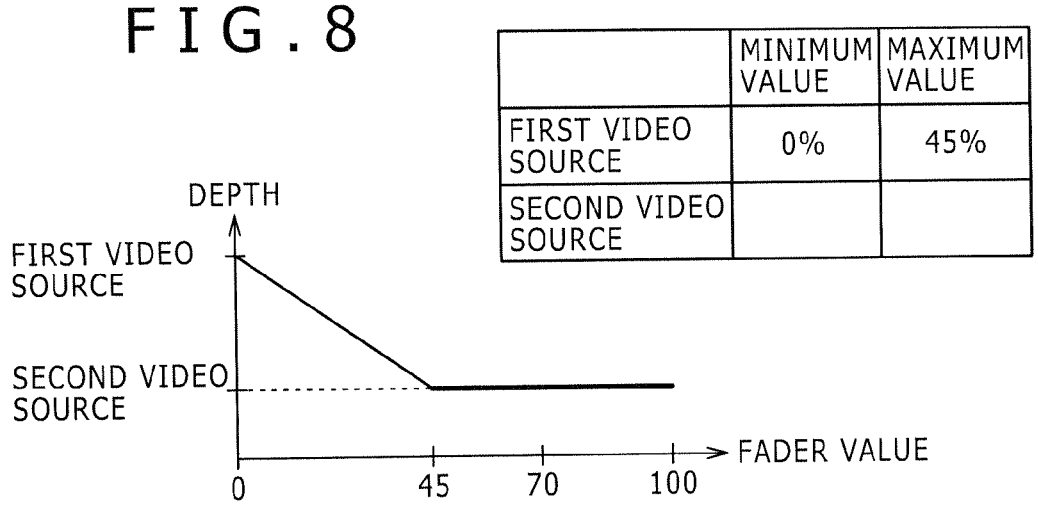
FIG. 8 is a diagram corresponding to a first example of a parallax adjusting section parameter.

FIG. 8 shows is a graph of a first example of the parallax adjustment section parameter held in the memory 53. In FIG. 8, the horizontal axis is representative of fader values while the vertical axis is representative of the depth based on parallax. The solid line is representative of the first video source while the dotted line is representative of the second video source. The thick line is representative of a period of time in which wiping is actually taking place. The values shown in the upper right are indicative of an example of parallax adjustment section parameters, that are fader values. This holds the same with following diagrams.

In FIG. 8, the second video source is not adjusted in parallax. The parallax of the first video source is adjusted such that the depth based on the parallax of the first video source approaches the parallax of the second video source. To be specific, in a section of fader values 0% to 45% (the first adjustment section), the parallax of the first video source is gradually matched with the parallax of the second video source. In this section, only the first video source is displayed. Then, in a section of fader values 45% to 100% (a wipe section), wiping is executed to switch the first video source to the second video source.

It should be noted that "match" herein includes a difference between the parallaxes of the first and second video sources that is below a predetermined threshold, in addition to a complete match.

Figure 9:
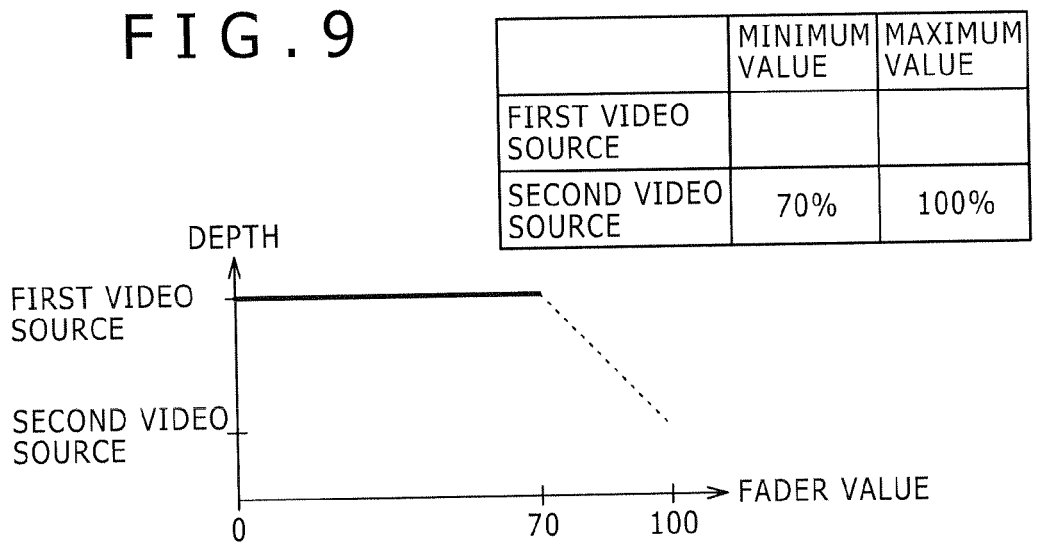
FIG. 9 is a diagram corresponding to a second example of the parallax adjusting section parameter.

FIG. 9 shows a graph of a second example of the parallax adjustment section parameter held in the memory 53. In FIG. 9, the first video source is not adjusted in parallax. The parallax of the second video source is adjusted such that the depth based on the parallax of the first video source approaches the parallax of the first video source. To be specific, when fader value is 0%, the parallax of the second video source is immediately matched with the parallax of the first video source. Then, in a section of fader values 0% to 70% (a wiping section), wiping is executed to switch the first video source to the second video source and, in a section of fader values 70% to 100% (the second adjustment section), the parallax of the second video source is gradually returned to the original value.

Figure 10:
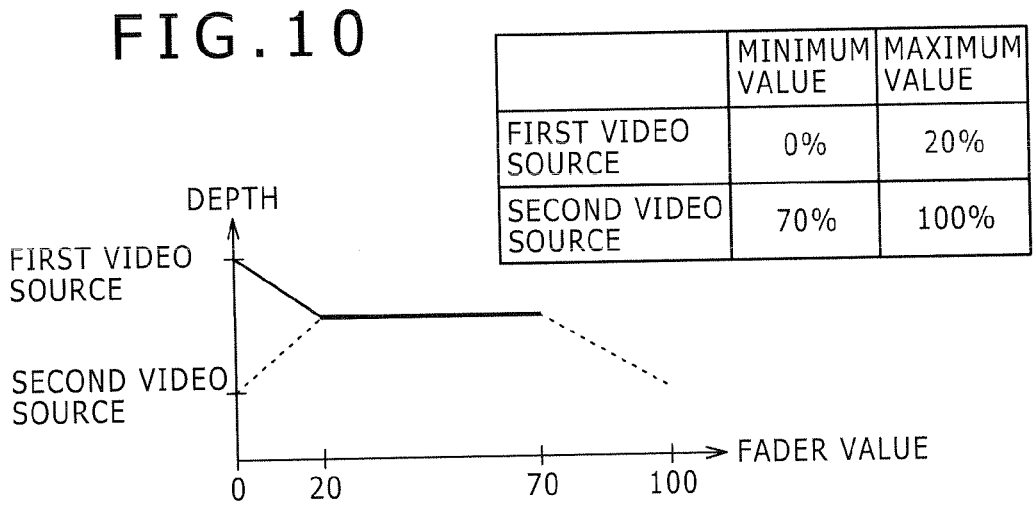
FIG. 10 is a diagram corresponding to a third example of the parallax adjusting section parameter.

FIG. 10 shows a graph of a third example of the parallax adjustment section parameter held in the memory 53. In FIG. 10, the parallaxes of the first and second video sources are adjusted such that the depth based on the parallaxes of the first and second video sources match each other on an intermediate point therebetween. To be more specific, after obtaining the intermediate value, the parallaxes of the first and second video sources are gradually brought to the intermediate point in a section of fader values 0% to 20% (the first adjustment section), thereby matching both parallaxes with each other. In this section, only the first video source is displayed. Then, in a section of fader values 20% to 70% (a wiping section), wiping is executed to switch the first video source to the second video source. Next, in a section of fader values 70% to 100% (the second adjustment section), the parallax of the second video source is gradually returned to the original value (the input value before being changed).

Figure 11:
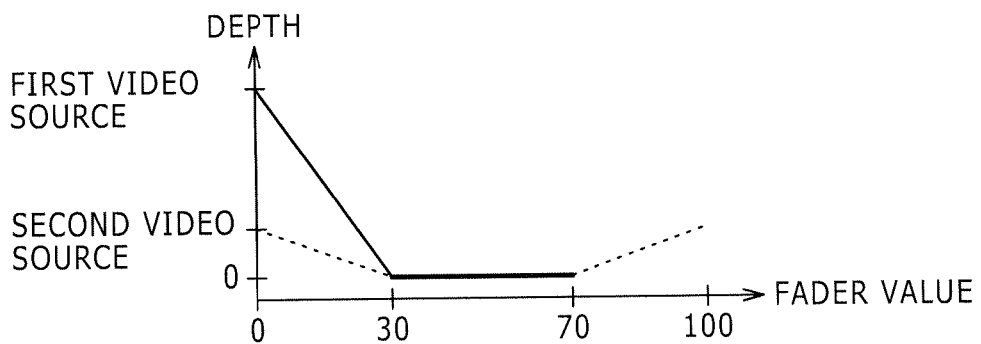
FIG. 11 is a diagram corresponding to a fourth example of the parallax adjusting section parameter.

FIG. 11 shows a graph of a fourth example of the parallax adjustment section parameter held in the memory 53. In FIG. 11, the parallaxes of the first and second video sources are adjusted such that, from a state in which the depths of the first and second video sources match each other, the depth based on the parallaxes of the first and second video sources is matched at zero. Unlike the examples described so far, the absolute value of the depth is taken into consideration. To be specific, in a section of fader values 0% to 30% (the first adjustment section), the parallaxes of the first and second video sources are gradually brought to zero to match both the parallaxes. In this section, only the first video source is displayed. Then, in a section of fader values 30% to 70% (the wiping section), wiping is executed to switch the first video source to the second video source. Next, in a section of fader values 70% to 100% (the second adjustment section), the parallax of the second video source is gradually returned to the original value.

Figure 12:
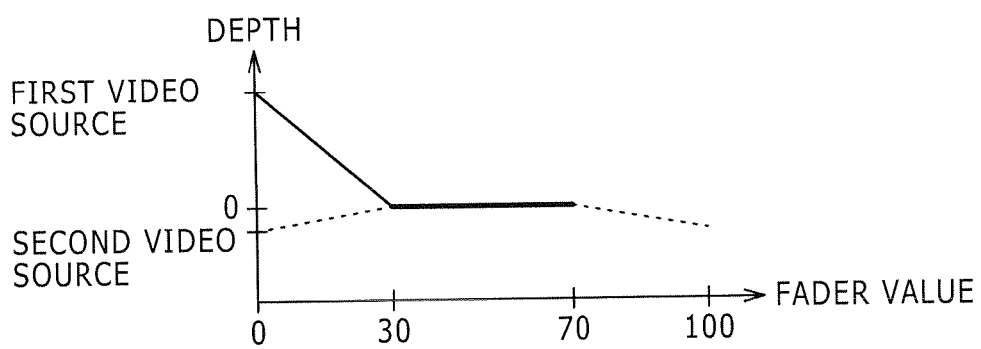
FIG. 12 is a diagram corresponding to a fifth example of the parallax adjusting section parameter.

FIG. 12 shows a graph of a fifth example of the parallax adjustment section parameter held in the memory 53. In FIG. 12, the parallaxes of the first and second video sources are adjusted such that, from a state in which the depths of the first and second video sources do not match each other, the depth based on the parallaxes of the first and second video sources is matched at zero. To be more specific, in a section of fader values 0% to 30% (the first adjustment section), the parallaxes of the first and second video sources are gradually brought to zero to match both parallaxes with each other. In this section, only the first video source is displayed. Then, in a section of fader values 30% to 70% (the wiping section), wiping is executed to switch the first video source to the second video source. Next, in a section of fader values 70% to 100% (the second adjustment section), the parallax of the second video source is gradually returned to the original value.

Figure 13:
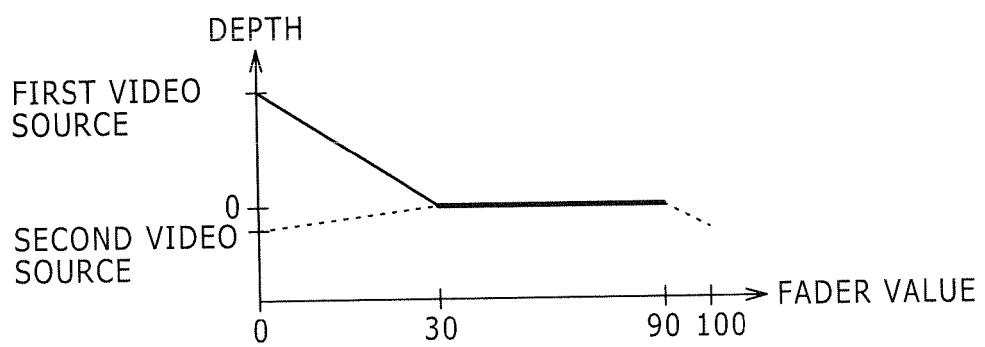
FIG. 13 is a diagram corresponding to a sixth example of the parallax adjusting section parameter.

FIG. 13 shows a graph of a sixth example of the parallax adjustment section parameter held in the memory 53. In FIG. 13, the parallaxes of the first and second video sources are adjusted such that, from a state in which the depths of the first and second video sources match with each other, the depth based on the parallaxes of the first and second video sources is matched at zero. In this case, the first and second adjustment sections are determined on the basis of a ratio between the depth of the first video source and the depth of the second video source. For example, if this ratio is 1:4, then the ratio between the first adjustment section and the second adjustment section is also 1:4. Namely, in a section of fader values 0% to 40% (the first adjustment section), the parallaxes of the first and second video source are gradually brought to zero to match both parallaxes with each other. Then, in a section of fader values 40% to 90% (the wiping section), wiping is executed to switch the first video source to the second video source. Next, in a section of fader values 90% to 100% (the second adjustment section), the parallax of the second video source is gradually returned to the original value.

Figure 14:
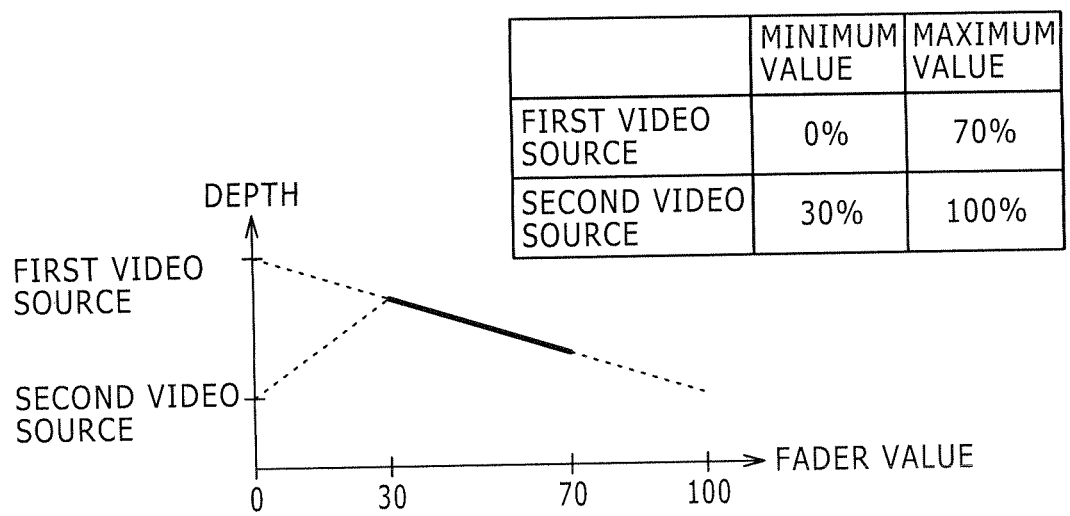
FIG. 14 is a diagram corresponding to a seventh example of the parallax adjusting section parameter.

FIG. 14 shows a graph of a seventh example of the parallax adjustment section parameter held in the memory 53. In FIG. 14, the parallaxes of the first and second video sources are adjusted such that, after gradually bringing the depths based on the parallaxes of the first and second video sources close to each other to be matched each other, the parallaxes linearly change while being wiped. To be more specific, in a section of fader values 0% to 30% (the first adjustment section), the parallaxes of the first and second video sources are gradually brought to each other to be matched with each other. In this section, only the first video source is displayed. Then, in a section of fader values 30% to 70% (the wiping section and the second adjustment section), the adjustment is continued with the parallaxes of the first and second video sources matched with each other while wiping is executed. In a section of fader values 70% to 100% (the second adjustment section), the parallax of the second video source is returned to the original value.

If the first video source is switched to the second video source by wiping, the parallax adjustment is executed as shown in any one of FIGS. 8 through 14.

[Switching Processing Involving Parallax Adjustment]

Figure 15:
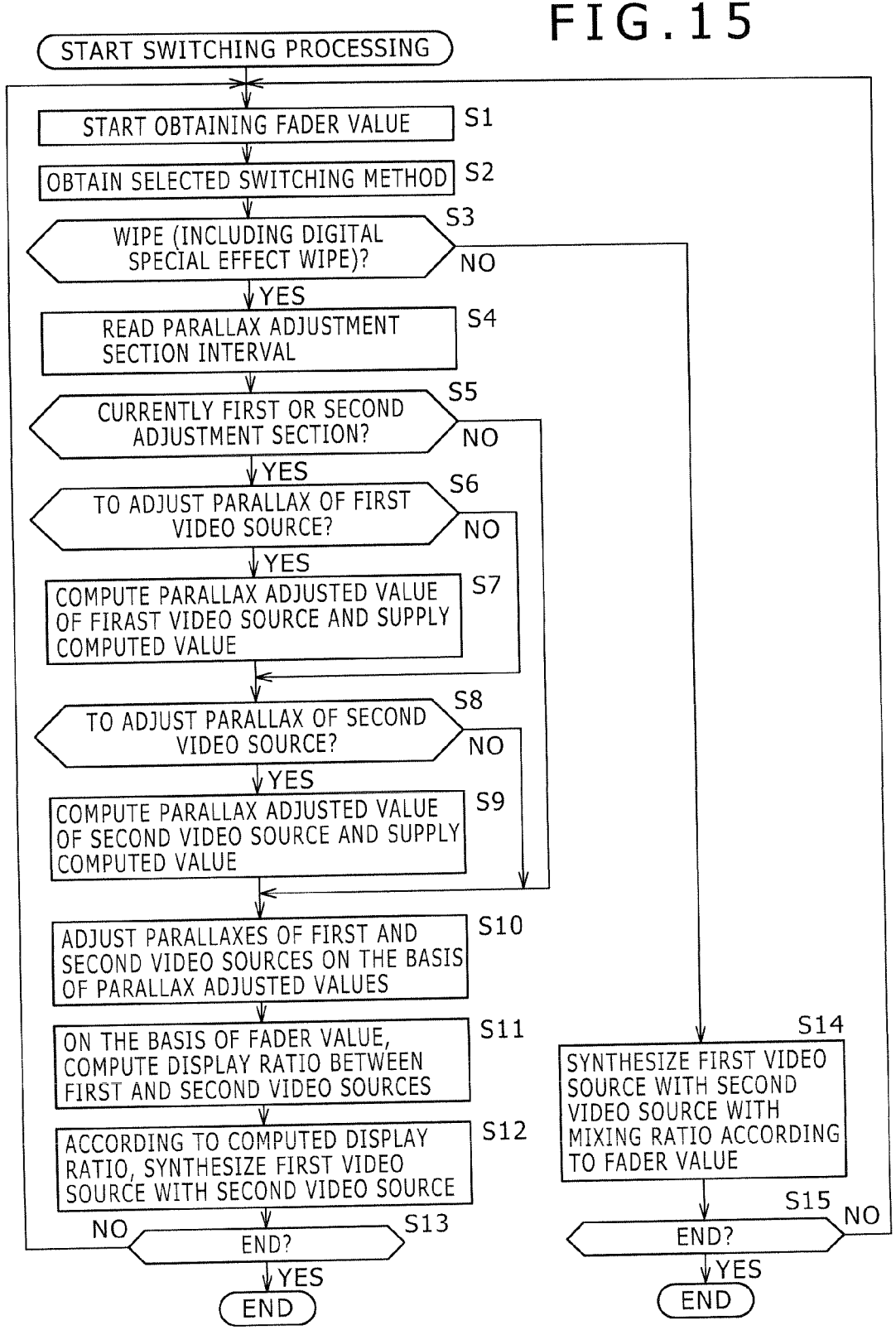
FIG. 15 is a flowchart indicative of switching processing.

The following describes the switching processing that involves parallax adjustment. FIG. 15 is a flowchart indicative of this switching processing. It should be noted that this switching processing assumes that the first and second video sources have already been selected by the user. The processing shown in FIG. 15 is executed for every frame or every field.

In step S1, the control block 12 starts obtaining a fader value corresponding to the position of the fader lever 23 of the operation input block 11. In step S2, the control block 12 obtains information whether the switching method selected by the user through the switching method select switch 22 of the operation input block 11 is instantaneous switching, wiping, or mixing. In step S3, the control block 12 determines whether the selected switching method is wiping or not. If the selected switching is found to be wiping, then the procedure goes to step S4.

In step S4, the parallax measuring unit 51 of the 3D video processing block 14 measures the parallax of the first video source to compute the first depth based on the measured parallax, outputting the computed depth to the parallax adjusting unit 54. At the same time, the parallax measuring unit 51 measures the parallax of the second video source to compute the second depth based on the measured parallax, outputting the computed depth to the parallax adjusting unit 54. The parallax adjusting unit 54 reads the parallax adjustment section parameter from the memory 53 and supplies this parameter to the control block 12.

In step S5, the control block 12 determines whether it is currently in the first adjustment section or the second adjustment section on the basis of the current fader value and the parallax adjustment section parameter. If it is found to be currently in the first adjustment section or the second adjustment section, then the procedure goes to step S6. If it is found not to be currently in the first adjustment section or the second adjustment section, namely, it is currently in the wiping section, then the procedure goes to step S10 by skipping step S6 through step S9.

In step S6, the control block 12 determines on the basis of the current fader value and the parallax adjustment section parameter whether to currently adjust the parallax of the first video source or not. If the parallax of the first video source is found to be adjusted, then the procedure goes to step S7. In step S7, the control block 12 computes a parallax adjustment value indicative of the amount of adjustment of the first video source on the basis of the current fader value and the parallax adjustment section parameter, thereby supplying a computed parallax adjustment value to the parallax adjusting unit 54.

If the parallax of the first video source is found not to be adjusted in step S6, then the procedure goes to step S8 by skipping step S7.

In step S8, the control block 12 determines on the basis of the current fader value and the parallax adjustment section parameter whether to currently adjust the parallax of the second video source or not. If the parallax of the second video source is found to be adjusted, then the processing goes to step S9. In step S9, the control block 12 computes a parallax adjustment value indicative of the amount of adjustment of the second video source on the basis of the current fader value and the parallax adjustment section parameter, thereby supplying a computed parallax adjustment value to the parallax adjusting unit 54.

If the parallax of the first video source is found not to be adjusted in step S8, then the procedure goes to step S10 by skipping step S9.

In step S10, the parallax adjusting unit 54 adjusts the parallax of the first video source in accordance with the amount of adjustment supplied from the control block 12 and outputs the adjusted parallax to the subsequent stage. At the same time, the parallax adjusting unit 54 adjusts the parallax of the second video source in accordance with the amount of adjustment supplied from the control block 12 and outputs the adjusted parallax to the subsequent stage. It should be noted that, if the amount of parallax adjustment is not supplied via step S6 and step S8, then the parallax is not adjusted. If transition is made from the step S5 to step S10, namely, if it is currently in the wiping period, then the parallax is adjusted by maintaining the parallax adjustment amount supplied so far.

In step S11, the control block 12 computes a current display ratio (a ratio with which the screen is occupied) between the first video source and the second video source on the basis of the wiping section obtained by the parallax adjustment section parameter and the current fader value, supplying the computed display ratio to the synthesizing units 49 of the switcher 13L and the switcher 13R. In step S12, the synthesizing units 49 synthesize the first video and the second video in accordance with the supplied display ratio, outputting the synthesized video to the subsequent stage.

In step S13, the control block 12 determines on the basis of the current fader value whether the switching has been completed or not (the fader value is 100% or not). If the switching is found not completed, then the procedure is returned to step S1 to repeat the above-mentioned processing therefrom. If the switching is found completed in step S13, then this switching processing ended.

It should be noted that, if the selected switching method is found not to be wiping, namely, the selected switching is instantaneous switching or mixing, then the procedure goes to step S14. In this case, the parallaxes of the first and second video sources are not adjusted.

In step S14, the control block 12 computes a current mixing ratio between the first video source and the second video source on the basis of the current fader value and supplies the computed mixing ratio to the synthesizing units 49 of the switcher 13L and the switcher 13R. The synthesizing units 49 synthesize the first video source and the second video source in accordance with the supplied mixing ratio, outputting the synthesized video to the subsequent stage.

In step S15, the control block 12 determines on the basis of the current fader value whether the switching has been completed or not (the fader value is 100% or not). If the switching is found not completed, then the procedure is returned to step S1 to repeat the above-mentioned processing therefrom until the switching is found completed. If the switching is found completed, then this switching processing ended.

According to the switching processing described above, when switching from the first video source to the second video source by wiping, the parallax of the first video source and the parallax of the second video source are matched with each other in the wiping period in which both the first video and the second video exist at the same time. This configuration mitigates the sense of abnormalcy or the burden to the eyes of the viewer who see the video being switched.

In addition, the adjustment of the parallaxes of the first and second video sources is executed in relation with user controllable fader values, thereby allowing the switching in match with user's intention.

[Variation 1]

Figure 16:
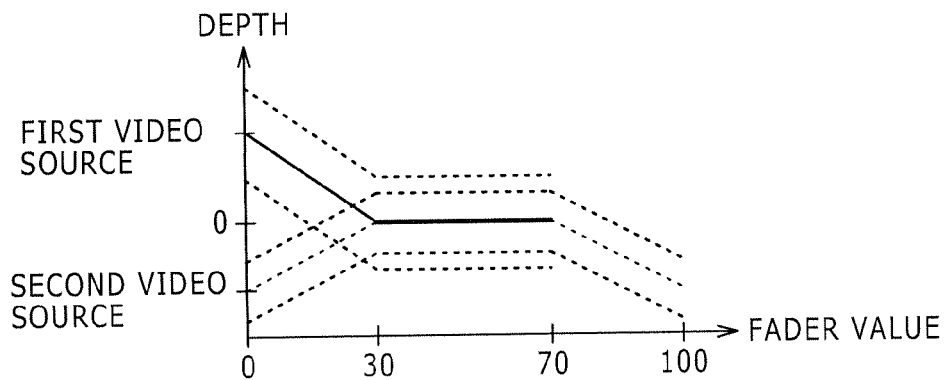
FIG. 16 is a diagram corresponding to the case where compression in depth is executed.

With the first and second videos, various objects may exist on the screens of these videos, so that the depths have different distances. To be more specific, if the parallax adjustment is executed as described above, differences in depth based on parallax are actually caused also in the wiping section as shown in FIG. 16.

Figure 17:
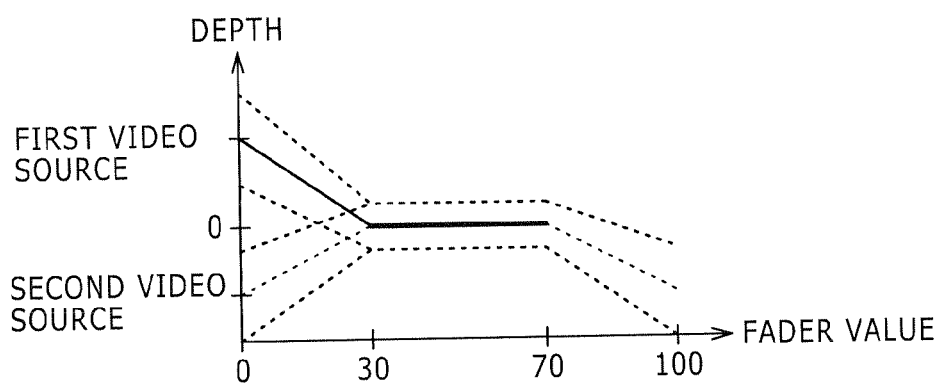
FIG. 17 is a diagram corresponding to the case where compression in depth is not executed.

In order to solve this problem, the distance of the depth of at least one of the first and second video sources may be compressed to match the distances of both depths at the time the parallaxes of the first and second video sources are adjusted as shown in FIG. 17. This compression eliminates the sense of abnormalcy felt by the viewer at video switching.

[Variation 2]

In the switching processing described above, parallax adjustment is executed only for the switching based on wiping. It is also practicable to execute parallax adjustment at the time of switching based on mixing.

Figure 18:
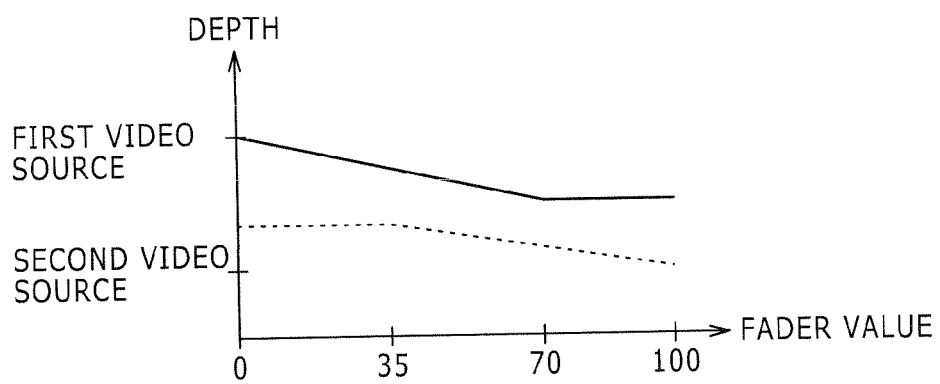
FIG. 18 is a diagram corresponding to the case where switching is executed by mixing.

FIG. 18 shows an example of parallax adjustment in which the first video source is switched to the second video source on the basis of mixing.

In the case of mixing, it is not necessary to match the depth of the first video source with the depth of the second video source like the wiping processing shown in FIG. 8 through FIG. 14. To be more specific, as shown in FIG. 18, the depth of the second video source is maintained constant in the initial stage of fader values, the depth of the first video source is gradually brought to the depth of the second video source, and the depth of the second video source is gradually returned to the original value in the end stage of fader values.

In the case of mixing, the parallax adjustment described above further smoothes the switching from the first video source to the second video source.

It should be noted that the embodiments of the present invention are applicable to systems of broadcasting stations that live broadcast the video taken by a camera immediately after the taking as well as editing systems for editing the video stored in VTRs for example and storing the edited video in VTRs as complete programs.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording medium, into a general-purpose personal computer for example in which various programs may be installed for the execution of various functions.

FIG. 19 is a block diagram illustrating an exemplary hardware configuration of a computer that executes the above-mentioned various processing operations by computer programs.

In a computer 100, a CPU (Central Processing Unit) 101, a ROM (Read Only Memory) 102, a RAM (Random Access Memory) 103 are interconnected by a bus 104.

The bus 104 is further connected to an input/output interface 105. The input/output interface 105 is connected to an input block 106 made up of a keyboard, a mouse, and a microphone, for example, an output block 107 made up of a display monitor and a loudspeaker, for example, a storage block 108 based on a hard disk and nonvolatile memory, for example, a communication block 109 based on a network interface for example, and a drive 110 for driving a removable media 111 such as a magnetic disk, an optical disk, a magneto-optical disk, or a semiconductor memory.

With computer 100 configured as described above, the CPU 101 loads a program from the storage block 108 into the RAM 103 via the input/output interface 105 and the bus 104 to execute the program, thereby executing the sequence of processing operations described above.

It should be noted that the program to be executed by the computer may execute the processing operations in a time-dependent manner in accordance with a sequence described herein or execute the processing operations in parallel or on an on-demand basis.

It should also be noted that a program to be executed by the computer may be processed by one unit of computer or by two or more units of computers in a distributed manner. In addition, the program may be transferred to a remote computer for execution.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Applications JP 2010-088463 and JP 2010-088464 filed in the Japan Patent Office on Apr. 7, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for editing a three-dimensional video, comprising:

switching means for switching a video during editing of the three-dimensional video from a first three-dimensional video recorded by a first video source to a second three-dimensional video recorded by a second video source by any one of a plurality of switching methods, wherein the first and second three-dimensional videos are received by the switching means via first and second input busses, respectively;

parallax measuring means for measuring a parallax in a three-dimensional video to compute a depth of the three-dimensional video on the basis of a measured parallax;

comparing means for comparing a difference between a first depth computed on said first three-dimensional video and a second depth computed on said second three-dimensional video that is different from said first three-dimensional video with a predetermined threshold; and restricting means for restricting an operation of said switching means in accordance with a comparison result obtained by said comparing means.

2. The image processing apparatus according to claim 1, wherein said plurality of switching methods includes at least wiping and, if the difference between said first depth and said second depth is found to be equal to or higher than said predetermined threshold, then said restricting means controls said switching means to restrict the switching from said first three-dimensional video to said second three-dimensional video by said wiping.

3. The image processing apparatus according to claim 2, further comprising:

holding means for holding said first three-dimensional video and said second three-dimensional video as still images, wherein said switching means uses said still image held in said holding means for a video to be used as an edited result during a period in which said first three-dimensional video is switched to said second three-dimensional image.

4. The image processing apparatus according to claim 2, wherein said plurality of switching methods includes at least wiping, instantaneous switching, and mixing.

5. The image processing apparatus according to claim 4, wherein, if the difference between said first depth and said second depth is found to be equal to or higher than the predetermined threshold, then said restricting means controls said switching means to execute switching from said first three-dimensional video to said second three-dimensional video by a switching method other than said wiping.

6. An image processing method for an image processing apparatus for editing a three-dimensional video, comprising the steps of:

switching a video during editing of the three-dimensional video from a first three-dimensional video recorded by a first video source to a second three-dimensional video recorded by a second video source by any one of a plurality of switching methods, wherein the first and second three-dimensional videos are received by the switching means via first and second input busses, respectively;

measuring a parallax in a three-dimensional video to compute a depth of the three-dimensional video on the basis of a measured parallax;

comparing a difference between a first depth computed on said first three-dimensional video and a second depth computed on said second three-dimensional video that is different from said first three-dimensional video with a predetermined threshold; and restricting an operation of said switching step in accordance with a comparison result obtained in said comparing step.

7. An image processing apparatus for editing a three-dimensional video, comprising:

switching means for switching a video during editing of the three-dimensional video from a first three-dimensional video recorded by a first video source to a second three-dimensional video recorded by a second video source by any one of a plurality of switching methods, wherein the first and second three-dimensional videos are received by the switching means via first and second input busses, respectively;

parallax measuring means for measuring a parallax between said first three-dimensional video and said second three-dimensional video to compute a depth on the basis of a measured parallax;

acquiring means for acquiring a fader value indicative of a degree of progress of a sequence of processing operations for switching said first three-dimensional video to said second three-dimensional video; and parallax adjusting means for adjusting parallaxes of said first three-dimensional video and said second three-dimensional video in accordance with the acquired fader value;

wherein, if wiping is selected for said switching method, said switching means switches said first three-dimensional video to said second three-dimensional video by wiping in a state where said parallaxes are adjusted so as to match the depth of said first three-dimensional video with the depth of said second three-dimensional video.

8. The image processing apparatus according to claim 7, further comprising:

holding means for holding a parallax adjustment section parameter indicative of separations between a first adjustment section, a switching section, and a second adjustment section that make up said sequence of processing operations, wherein said switching means switches said first three-dimensional video to said second three-dimensional video by wiping in a state where said parallaxes are adjusted so as to match the depth of said first three-dimensional video with the depth of said second three-dimensional video.

9. The image processing apparatus according to claim 8, wherein, in response to a progress of the acquired fader value, said parallax adjusting means adjusts the parallax of at least one of said first three-dimensional video and said second three-dimensional video such that said depth of said first three-dimensional video and said depth of said second three-dimensional video match each other in said first adjustment section and adjusts the parallax of said second three-dimensional video to be returned to an original value thereof in said second adjustment section.

10. The image processing apparatus according to claim 9, wherein, in response to a progress of said acquired fader value, said parallax adjusting means adjusts the parallax of at least one of said first three-dimensional video and said second three-dimensional video such that at least one of distances of said depths of said first three-dimensional video and said second three-dimensional video is compressed to match the distances of said depths in said first adjustment section and adjusts the parallax of the said second three-dimensional video to be returned to an original value thereof in said second adjustment section.

11. The image processing apparatus according to claim 8, wherein, if mixing is selected for said switching method, said switching means switches said first three-dimensional video to said second three-dimensional video in a state where said parallaxes are adjusted so as to bring the depth of said first three-dimensional video to the depth of said second three-dimensional video.

12. The image processing apparatus according to claim 8, further comprising: operation input means for a user to control said fader value.

13. An image processing method for an image processing apparatus for editing a three-dimensional video, comprising the steps of:

measuring a parallax for each of a first three-dimensional video recorded by a first video source to a second three-dimensional video recorded by a second video source to compute a corresponding depth of each of the first three-dimensional video and the second three-dimensional video on the basis of the measured parallaxes;

acquiring a fader value indicative of a degree of progress of a sequence of processing operations for switching said first three-dimensional video to said second three-dimensional video; and adjusting parallaxes of said first three-dimensional video and said second three-dimensional video in accordance with the acquired fader value; and if wiping is selected for a switching method, switching said first three-dimensional video recorded by said first video source to said second three-dimensional video recorded by said second video source during editing of the three-dimensional video by wiping in a state where said parallaxes are adjusted such that said depths of said first three-dimensional video and said second three-dimensional video match each other.

14. An image processing apparatus for editing a three-dimensional video, comprising:

a switching section configured to switch a video during editing of the three-dimensional video from a first three-dimensional video recorded by a first video source to a second three-dimensional video recorded by a second video source by any one of a plurality of switching methods, wherein the first and second three-dimensional videos are received by the switching section via first and second input busses, respectively;

a parallax measuring section configured to measure a parallax in a three-dimensional video to compute a depth of the three-dimensional video on the basis of a measured parallax;

a comparing section configured to compare a difference between a first depth computed on said first three-dimensional video and a second depth computed on said second three-dimensional video that is different from said first three-dimensional video with a predetermined threshold; and a restricting section configured to restrict an operation of said switching section in accordance with a comparison result obtained by said comparing section.

15. An image processing apparatus for editing a three-dimensional video, comprising:

a switching section configured to switch a video during editing of the three-dimensional video from a first three-dimensional video recorded by a first video source to a second three-dimensional video recorded by a second video source by any one of a plurality of switching methods, wherein the first and second three-dimensional videos are received by the switching section via first and second input busses, respectively;

a parallax measuring section configured to:
    measure a first parallax for said first three-dimensional video and a second parallax for said second three-dimensional video; and
    compute a depth of the first three-dimensional video on the basis of the first parallax and a depth of the second three-dimensional video on the basis of the second parallax;

an acquiring section configured to acquire a fader value indicative of a degree of progress of a sequence of processing operations for switching said first three-dimensional video to said second three-dimensional video; and a parallax adjusting section configured to adjust parallaxes of said first three-dimensional video and said second three-dimensional video in accordance with the acquired fader value;

wherein, if wiping is selected for said switching method, said switching section switches said first three-dimensional video to said second three-dimensional video by wiping in a state where said parallaxes are adjusted so as to match the depth of said first three-dimensional video with the depth of said second three-dimensional video.

* * * * *